United States Patent [19]
Yano et al.

[11] Patent Number: 6,108,068
[45] Date of Patent: Aug. 22, 2000

[54] LIQUID CRYSTAL DISPLAY APPARATUS USING SPACERS HAVING DOUBLE STRUCTURE

[75] Inventors: Tomoya Yano, Kanagawa; Masanobu Tanaka, Aichi, both of Japan

[73] Assignee: Sony Corporation, Tokyo, Japan

[21] Appl. No.: 09/384,794

[22] Filed: Aug. 27, 1999

[30] Foreign Application Priority Data

Aug. 28, 1998 [JP] Japan .................................. 10-243905

[51] Int. Cl.⁷ .................. G02F 1/1339; G02F 1/133; G02F 1/1333
[52] U.S. Cl. ............................ 349/155; 349/32; 349/60
[58] Field of Search ................ 349/155, 60, 32

[56] References Cited

U.S. PATENT DOCUMENTS

| | | | |
|---|---|---|---|
| 4,308,533 | 12/1981 | Schmidt | 340/784 |
| 4,626,073 | 12/1986 | Amstutz et al. | 350/344 |
| 5,001,302 | 3/1991 | Atsumi | 174/94 |
| 5,005,951 | 4/1991 | Te Velde | 350/334 |
| 5,142,395 | 8/1992 | Yamazaki et al. | 359/81 |
| 5,349,455 | 9/1994 | Hayashi et al. | 359/54 |
| 5,515,191 | 5/1996 | Swirbel | 359/81 |
| 5,519,520 | 5/1996 | Stoller | 359/55 |
| 5,907,311 | 5/1999 | Yano | 345/4 |
| 5,923,389 | 7/1999 | Seki | 349/32 |
| 5,963,288 | 10/1999 | Sato et al. | 349/154 |
| 5,982,471 | 11/1999 | Hirakata et al. | 349/155 |
| 6,014,188 | 1/2000 | Yamada et al. | 349/32 |

*Primary Examiner*—Kenneth Parker
*Assistant Examiner*—Mike Qi
*Attorney, Agent, or Firm*—Hill & Simpson

[57] ABSTRACT

In a liquid crystal display apparatus including a liquid crystal layer sandwiched by a front glass substrate and a back glass substrate, spacers contained in the liquid crystal layer to maintain a predetermined thickness of the liquid crystal layer are made from a conductive material. This enables to reduce flicker and baking generated by electric charge caused by impurities ions remaining on the boundary surface of the liquid crystal layer.

8 Claims, 5 Drawing Sheets

LIQUID CRYSTAL DISPLAY APPARATUS USING SPACERS HAVING DOUBLE STRUCTURE

RELATED APPLICATION DATA

The present application claims priority to Japanese Application No. P10-243905 filed Aug. 28, 1998 which application is incorporated herein by reference to the extent permitted by law.

BACKGROUND OF THE INVENTION

1. Field of the Invention

The present invention relates to a liquid crystal display apparatus including a liquid crystal layer sandwiched by electrodes and a glass substrate.

2. Description of the Prior Art

A conventional liquid crystal display (LCD) apparatus includes a liquid crystal layer sandwiched by electrodes which are further sandwiched by a front glass substrate and a back glass substrate.

As such a liquid crystal display apparatus, there has been suggested a plasma addressed liquid crystal (PALC) display apparatus which includes a first electrodes arranged on a first side of the liquid crystal layer and a second electrodes forming a plurality of plasma discharge channels in a direction vertical to the first electrodes.

In the aforementioned liquid crystal display apparatus, a so-called "baking phenomenon" often occurs after a display of a still image. That is, when the image is switched to another image, an effect of the still image remains. This phenomenon is caused by an electric charge remaining on a boundary surface between the electrodes when the display image is switched to another.

In the aforementioned plasma addressed type liquid crystal display apparatus, the lower surface of the dielectric sheet serves as a virtual electrode and an electric charge corresponding to a signal applied is subjected to sample hold and in the next field, an electric charge of the opposite polarity is subjected to sample hold. During each of these sample holds, impurities ion present in the liquid crystal move toward both crystal orientation film boundary surfaces. When the polarity is switched to the other, ions on the boundary surface move backward, leaving some ions on the orientation film boundary surfaces. The remaining ions are concentrated at one of the boundary surface. This deviation is overlapped as a DC offset on the liquid crystal layer, causing flicker. This portion having the flicker is observed as baking.

SUMMARY OF THE INVENTION

It is therefore an object of the present invention to provide a liquid crystal display apparatus capable of reducing flicker and baking caused by electric charge of the impurities ion remaining on the boundary surface of the liquid crystal The liquid crystal display apparatus according to the present invention includes: first electrodes arranged to face a first surface of the liquid crystal layer; second electrodes arranged to face a second surface of the liquid crystal layer; a front glass substrate and a back glass substrate arranged to sandwich the liquid crystal layer and the first and the second electrodes, wherein the thickness of the liquid crystal layer is maintained by electro-conductive spacers contained in the liquid crystal layer.

According to another aspect of the present invention, portions corresponding to adjacent pixels on the liquid crystal layer have electric conductivity.

According to still another aspect of the present invention, a conductive film is formed on the liquid crystal layer having a hardness lower than that of the glass substrate.

DESCRIPTION OF THE PREFERRED EMBODIMENT

Description will now be directed to a preferred embodiment of the present invention.

Figure 1:
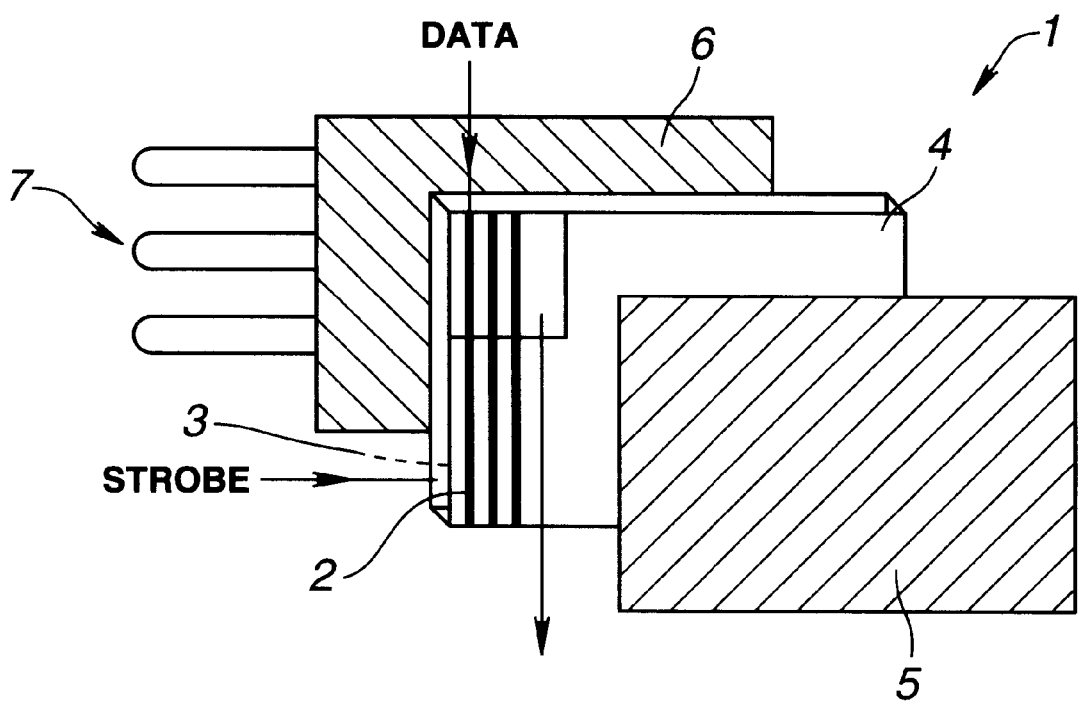
FIG. 1 is an exploded perspective view of an entire liquid crystal display apparatus according to the present invention.
Figure 2:
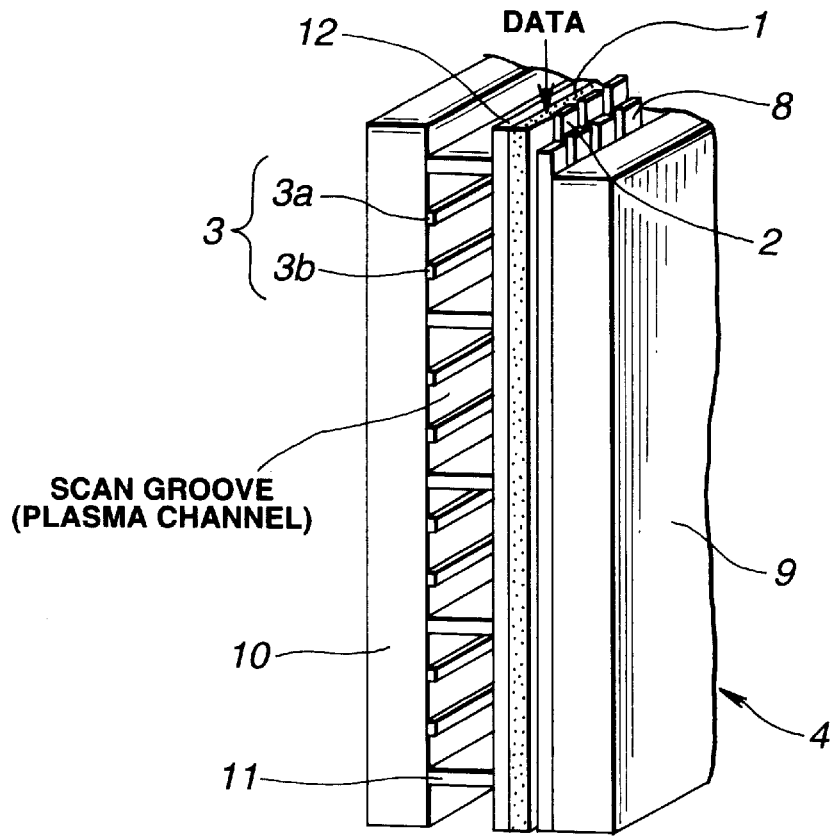
FIG. 2 is a perspective view of an essential portion of the aforementioned liquid crystal display apparatus.

In this embodiment, the crystal display apparatus according to the present invention is applied to a plasma addressed type liquid crystal display apparatus. As shown in FIG. 1 and FIG. 2, this liquid crystal display apparatus includes a liquid crystal display element 4 having: a liquid crystal layer 1; a first electrodes 2 (column electrodes) which is transparent and provided on a first surface, i.e., front surface of the liquid crystal layer 1; and a second electrodes 3 (scan electrodes) provided on a second surface, i.e., back surface of the liquid crystal layer 1 so as to constitute a plurality of plasma discharge channels in a direction therefore to the first electrodes 2. In front of this liquid crystal display element 4, there is provided a polarizing filter 5. Moreover, behind the liquid crystal element 4, there are provided a polarizing filter 6 and a back light 7.

As shown in FIG. 2, in the liquid crystal display element 4, a color filter 8 is provided in the front side of the first electrodes 2. Moreover, in front of this color filter 8, there is provided a front glass 9.

Behind the liquid crystal layer 1, there is provided a dielectric sheet 12. Behind the dielectric sheet 12, there are provided via a plurality of partitions 11 a back glass 10 serving as a plasma substrate. This second electrodes 3 is formed on the front of the back glass 10. Each of the second electrodes 3 consists of an anode electrode 3a and a cathode electrode 3b. The second electrodes 3 constitute the plasma discharge channels.

In this liquid crystal display apparatus, a strobe signal is supplied to the cathode electrodes 3b and a data signal is supplied to the first electrodes 2 so as to display an image.

Figure 3:
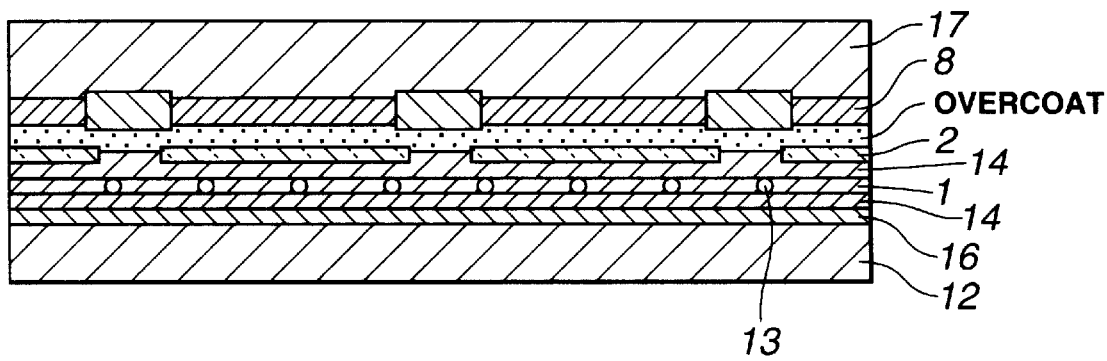
FIG. 3 is a cross sectional view of the aforementioned essential portion of the liquid crystal display apparatus.

In the liquid crystal display element 4 of this liquid crystal display apparatus, as shown in FIG. 3, a spacer 13 is provided to maintain the thickness of the liquid crystal layer 1. As will be detailed later, this spacer 13 is electroconductive. Moreover, behind the liquid crystal layer 1, there are provided crystalline orientation film 14 and the dielectric sheet 12. Between the orientation film 14 and the dielectric sheet 12, there is provided a conductive thin film 16 having a predetermined conductivity.

The orientation film 14 has a thickness of 100 to 1000 Angstrom. Considering the object of the present invention, it is preferable that the orientation film 14 be thin. Moreover, the density of spacers 13 is set in the order of 100 pieces /mm$^2$.

Figure 4:
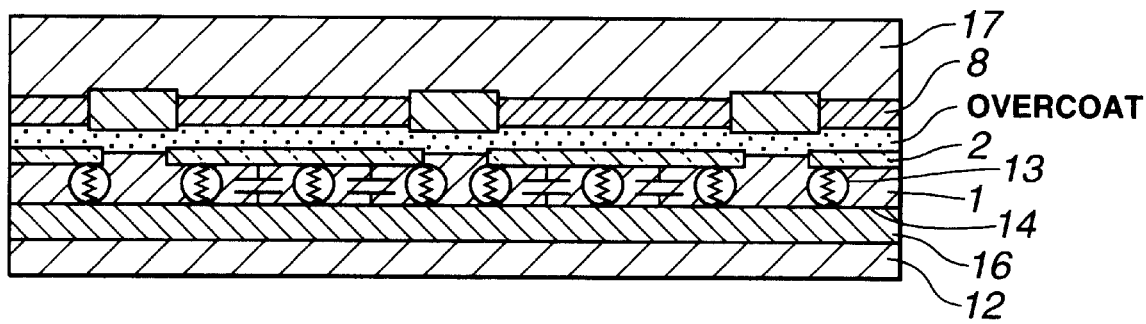
FIG. 4 is an enlarged cross sectional view of the essential portion of the liquid crystal display apparatus.

FIG. 4 shows an equivalent circuit of liquid crystal layer and its surrounding in the liquid crystal display apparatus. The electric charge accumulated on the boundary surface between the liquid crystal layer 1 and the orientation film 14 leaks through the orientation film 14 and, where in contact with the spacers 13, leaks to the first electrodes 2.

When there is leak of the electric charge accumulated on the boundary surface between the liquid crystal layer 1 and the orientation film 14, even if ions are unevenly adsorbed to the boundary surface, this does not affect the electric field of the liquid crystal layer 1. That is, this liquid crystal display apparatus can prevent the phenomenon of baking.

In this liquid crystal display apparatus, there may be generated a DC offset, but the DC offset is reduced by presence of the spacer 13 and the conductive thin film 16.

In this liquid crystal display apparatus, a DC voltage component applied to the liquid crystal layer 1 corresponds to the resistance division ratio between the resistance of the dielectric sheet 12 and the resistance of the liquid crystal layer 1. However, since an average resistance value of the liquid crystal layer 1 has been lowered, the resistance ratio is reduced, which in turn reduces the DC voltage component applied to the liquid crystal layer 1.

Here, an explanation will be given on a preferable resistance value of the spacer 13 and the conductive film 16. For the purpose of leaking the electric charge adsorbed to the boundary surface between the liquid crystal layer 1 and the orientation film 14, it is preferable that the resistance value of spacer 13 and the resistance value of the conductive thin film 16 be small because this enables to reduce the mitigation time. However, if the spacer 13 has a too low resistance value, there will arise a problem that it is impossible to maintain to the next selection period the voltage which has been subjected to the sample hold. Moreover, if the conductive thin film 16 has a too small resistance value, when different data items are written in two adjacent pixels, the voltage values which has been subjected to the sample hold for the respective pixels may be averaged by the conductive thin film 16. For example, when the color filter 8 has RGB color stripes corresponding to the first electrodes 2, if the voltage values which has been subjected to the sample hold are averaged between the pixels, a monochromatic display becomes almost gray. Considering these facts, the resistance values of the spacer 13 and the conductive thin film 16 can be defined as follows. That is, as has been described above, if the density of spacers 13 is assumed to be 100 pieces/mm$^2$, the resistance value for a single spacer 13 should be 10$^{13}$ Ω. Moreover, the resistance value of the conductive thin film 16 should be 10$^{13}$ Ω/mm$^2$.

Figure 5:
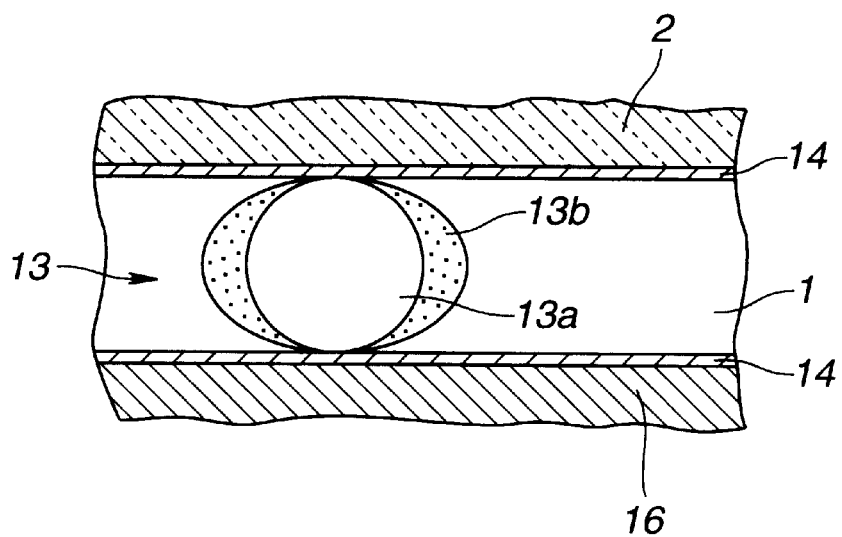
FIG. 5 is an enlarged cross sectional view of a spacer configuration of the liquid crystal display apparatus.

The spacers 13 cannot achieve the aforementioned effect if not in electric contact to the substrates on both sides of the liquid crystal layer 1. For example, as shown in FIG. 5, the spacer 13 may include: a kernel portion 13*a* having a comparatively high hardness which decides the thickness of the liquid crystal layer 1; and an external hull portion 13*b* having a low hardness to cover the kernel portion 13*a*. In the spacer 13 shown in FIG. 5, at least the external hull portion 13*b* has electric conductivity.

Figure 6:
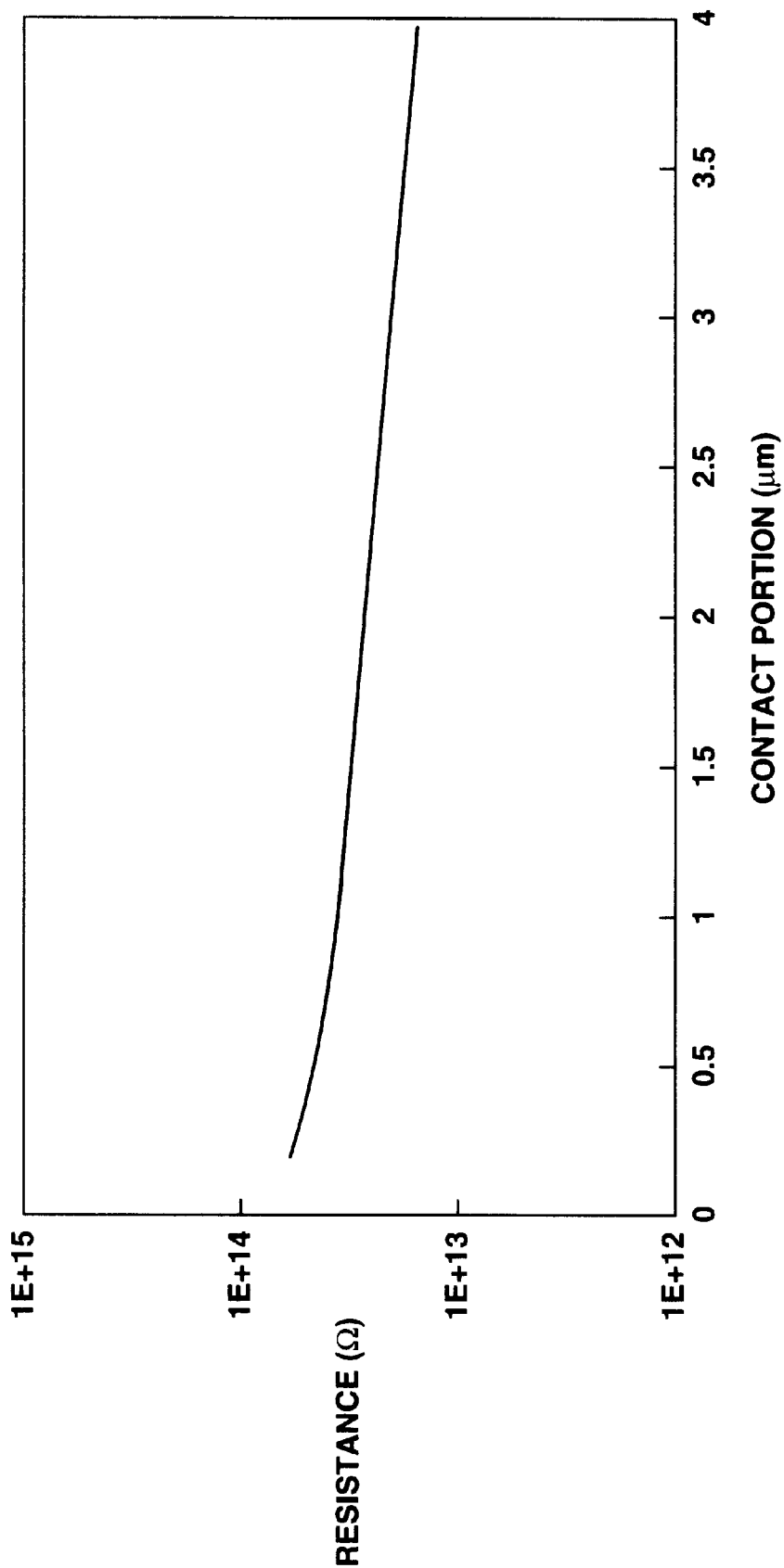
FIG. 6 is a graph showing a relationship between a single spacer contact area with the substrate and a resistance value.

In the liquid crystal display apparatus, in order to maintain a predetermined thickness of the liquid crystal layer 1, the liquid crystal layer 1 is set to have a negative pressure compared to the atmospheric pressure. Accordingly, the substrates on the both sides of the liquid crystal layer 1 pushes the respective spacers 13, and the external hull portion 13*b* having a low hardness are deformed and the substrates are brought into electric contact with the respective spacers 13. FIG. 6 shows a relationship between a contact area (with the substrates) and a resistance value of a single spacer 13. As shown in FIG. 6, as the contact area increases, the resistance value change can be more suppressed.

Figure 7:
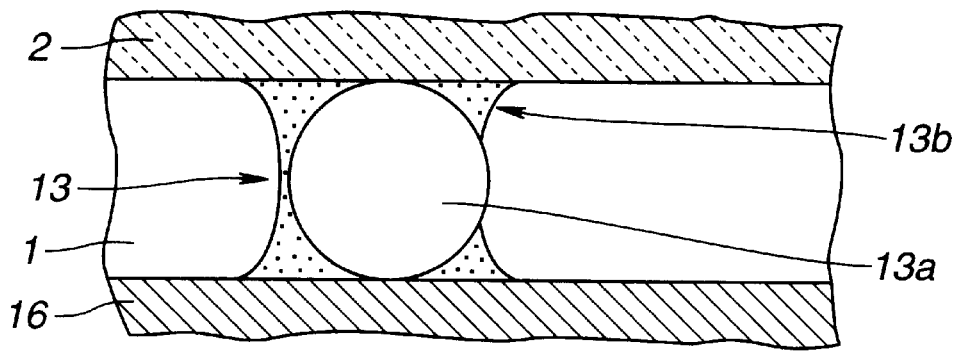
FIG. 7 is an enlarge cross sectional view showing a spacer configuration of the liquid crystal display apparatus according to another embodiment of the present invention.

Moreover, as shown in FIG. 7, the respective spacers may have the external hull portion 13*b* made from a thermal hardening type epoxy resin or the like. When using the spacers 13, a number of spacers 13 are dispersed for one of the substrates which sandwich the liquid crystal layer 1 and these spacers 13 are covered by the other substrate. After the substrates are attached to each other, the substrates are heated up to a predetermined temperature in the order of 120° C. to 150° C. so as to fix the substrates. In this case also, the spacer 13 has the external hull portion 13*b* having electric conductivity and accordingly, the both substrates can be fixed in the electro-conductive state.

In this liquid crystal display apparatus, the substrates on both sides of the liquid crystal layer can be electrically connected by using the elastic spacers as has been described above, or by other configuration such as forming an elastic film on the substrates. For example, a conductive thin film can be formed as an elastic film. Moreover, it is possible to provide an elastic film between the conductive thin film and the substrates. Furthermore, it is also possible to form a flattening film having elasticity.

Moreover, when the orientation film has a function of conductive thin film, the aforementioned effect is assured. The orientation film, in general, has a volume resistance of 10$^{16}$ Ω cm. If this orientation film has a thickness exceeding 1000 Angstrom, the thickness of this orientation film cannot be ignored and it becomes impossible to electrically connect the first electrodes to the conductive thin film on the dielectric sheet via spacers. Since the orientation film is in direct contact with spacers, the electrical connection is assured by making the orientation film conductive.

Figure 8:
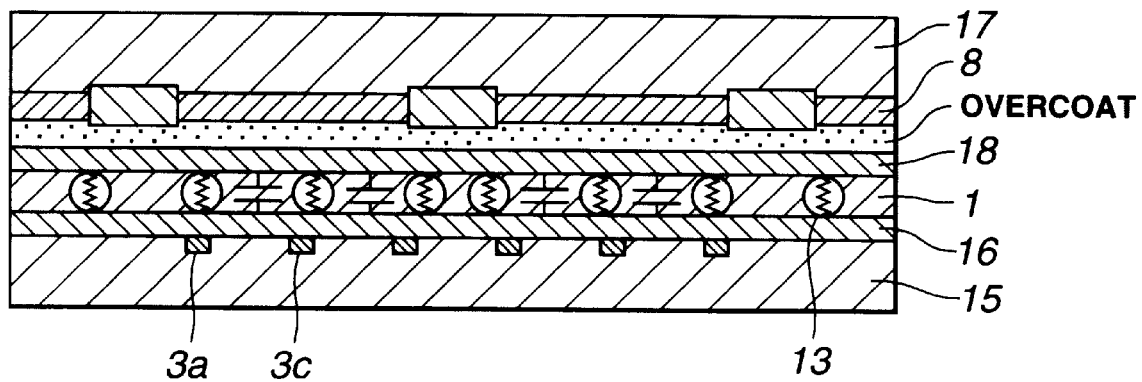
FIG. 8 is a cross sectional view of the present invention applied to a liquid crystal display apparatus of an "IPS configuration".

It should be noted that liquid crystal apparatus according to the present invention is not to be limited to the aforementioned PALC (plasma addressed liquid crystal) type but can also applied to the TFT (thin film transistor) type, especially IPS (in plane switching) type. That is, as shown in FIG. 8, in the IPS type liquid crystal display apparatus, pixel electrodes 3*c* and the common electrodes 3*d* are formed on the same lower substrate 15, and no electrodes are formed on the opposing upper substrate 17. Ions adsorbed onto the orientation film boundary surface of the upper substrate 17 are in electrically isolated state, and there s a possibility to cause baking. To cope with this, a conductive thin film 18 is formed on the upper substrate 17 so that the spacers 13 are conductive, so as to leak the electric charge from the upper substrate 17, thus lowering the baking. In this case, configuration of the spacers 13 and conductive thin films 16, 18 are identical to those in PALC configuration.

Moreover, in the TFT type liquid crystal display apparatus in which common electrodes are formed on the opposing substrate, the orientation film thickness is reduced to 1000 Angstrom or below, so that the spacers are electroconductive, thus eliminating use of the conductive thin film.

Moreover, the liquid crystal display apparatus can also be constituted by a conductive orientation film in combination with conductive spacers.

Furthermore, it is possible to form an insulating layer and a conductive thin film between the pixel electrodes and the orientation film so, as to be used in combination with the conductive spacers. It is also possible that one film serves as the conductive thin film and the orientation film. By providing an insulating layer, it is possible to eliminate a DC component caused by suspending capacity between the gate electrodes and the pixel electrodes. That is, by setting the resistance of the insulating layer higher than that of the liquid crystal layer, no DC component is applied to the liquid crystal layer.

As has been described above, in the liquid crystal display apparatus according to the present invention, impurities ion electric charge remaining in the liquid crystal layer is made to leak, thus preventing display failure due to baking.

That is, the present invention enables to provide a liquid crystal display apparatus which can reduce flicker and baking caused by electric charge by impurities ions remaining on the boundary surface of the liquid crystal layer.

What is claimed is:

1. A liquid crystal display apparatus comprising:
   a liquid crystal layer sandwiched by a front glass substrate and a back glass substrate, wherein the liquid crystal layer having a plurality of spacers, at least some of which have electro-conductivity and serve to maintain a thickness of the liquid crystal layer, at least some of the spacers having a double structure consisting of an elastic external portion and a kernel portion made from a material having a hardness higher than that of the elastic external portion, and at least the external hull portion being electrically conductive.

2. A liquid crystal display apparatus as claimed in claim 1, the liquid crystal layer further contains another type of spacers in addition to the conductive spacers so as to maintain the thickness of the liquid crystal layer.

3. A liquid crystal display apparatus comprising:
   a liquid crystal layer having a plurality of conductive spacers;
   first electrodes arranged on a first surface of the liquid crystal layer;
   a conductive orientation film arranged on a second surface of the liquid crystal layer;
   a dielectric film arranged on the orientation film;
   second electrodes connected to the dielectric film; and
   a front glass substrate and a back glass substrate arranged to sandwich the liquid layer, the spacers, the orientation film, the dielectric film and the first and second electrodes between the front and back glass substrates,
   wherein each spacer engages both the orientation film and one of said first electrodes.

4. A liquid crystal display apparatus as claimed in claim 3, wherein a film made from a material having a spectral characteristic to cut off ultraviolet rays and arranged on the liquid crystal layer has electric conductivity.

5. A liquid crystal display apparatus as claimed in claim 3, wherein the liquid crystal layer is covered by a film made from a material having a hardness lower than that of the glass substrate.

6. A plasma addressed liquid crystal display apparatus comprising:
   column electrodes arranged on the front side of a liquid crystal layer; and
   plasma electrodes arranged on the back side of the liquid crystal layer so as to form a plurality of plasma discharge channels in a direction perpendicular to the column electrodes,
   wherein orientation films provided in contact with the liquid crystal layer and spacers for maintaining a predetermined thickness of the liquid crystal layer are made from conductive materials so as to leak the electric charge accumulated on the boundary between the liquid crystal layer and the orientation films.

7. A plasma addressed liquid crystal display apparatus as claimed in claim 6, wherein an orientation film and a dielectric sheet are arranged at the back side of the liquid crystal layer, and a conductive thin film is arranged between the orientation film and the dielectric sheet.

8. A plasma addressed liquid crystal display apparatus as claimed in claim 6, wherein if the spacer density is 100 pieces/mm$^2$, a resistance value of each of the spacers is $10^{13}$ $\Omega$ and a sheet resistance value of the conductive thin film is $10^{13}$ $\Omega/mm^2$.

* * * * *